(12) United States Patent
Ward (10) Patent No.: US 8,818,151 B1
(45) Date of Patent: Aug. 26, 2014

(54) FIBER PUMP SIGNAL COMBINER

(75) Inventor: Benjamin G. Ward, Colorado Springs, CO (US)

(73) Assignee: United States of America as represented by the Secretary of the Air Force, Washington, DC (US)

( * ) Notice: Subject to any disclaimer, the term of this patent is extended or adjusted under 35 U.S.C. 154(b) by 880 days.

(21) Appl. No.: 12/760,577

(22) Filed: Apr. 15, 2010

Related U.S. Application Data

(60) Provisional application No. 61/230,804, filed on Aug. 3, 2009.

(51) Int. Cl.
*G02B 6/26* (2006.01)
(52) U.S. Cl.
USPC .............. 385/43; 385/50; 385/115; 385/31; 385/51; 359/341.1; 359/341.3; 359/33; 65/406; 65/409; 372/6; 264/1.28; 398/82
(58) Field of Classification Search
USPC ............... 385/43, 50, 115, 31, 51; 359/341.1, 359/341.3, 33; 65/406, 409; 372/6; 264/1.28; 398/82
See application file for complete search history.

(56) References Cited

U.S. PATENT DOCUMENTS

| | | | |
|---|---|---|---|
| 4,445,751 A * | 5/1984 | Divens et al. | 385/43 |
| 4,606,020 A | 8/1986 | Ruffin | |
| 4,744,623 A * | 5/1988 | Prucnal et al. | 385/14 |
| 5,664,036 A * | 9/1997 | Islam | 385/31 |
| 5,694,408 A | 12/1997 | Bott et al. | |
| 5,761,234 A | 6/1998 | Craig et al. | |
| 5,864,644 A * | 1/1999 | DiGiovanni et al. | 385/43 |
| 5,999,673 A * | 12/1999 | Valentin et al. | 385/43 |
| 6,212,310 B1 | 4/2001 | Waarts et al. | |
| 6,330,264 B1 | 12/2001 | Kussmaul | |
| 6,336,749 B1 * | 1/2002 | O'Toole et al. | 385/96 |
| 6,434,302 B1 | 8/2002 | Fidric et al. | |
| 6,456,637 B1 * | 9/2002 | Holcomb et al. | 372/40 |
| 6,512,867 B2 * | 1/2003 | Brosnan | 385/27 |
| 6,608,951 B1 * | 8/2003 | Goldberg et al. | 385/43 |
| 6,731,837 B2 * | 5/2004 | Goldberg et al. | 385/27 |
| 6,807,001 B1 | 10/2004 | Ranka et al. | |
| 6,816,652 B1 | 11/2004 | Lin et al. | |
| 6,823,117 B2 | 11/2004 | Vakili et al. | |
| 6,842,570 B2 * | 1/2005 | Komine | 385/43 |
| 6,987,783 B2 * | 1/2006 | Fajardo et al. | 372/6 |
| 7,046,875 B2 * | 5/2006 | Gonthier et al. | 385/28 |
| 7,106,932 B2 * | 9/2006 | Birks et al. | 385/123 |
| 7,155,097 B2 * | 12/2006 | Jakobsen et al. | 385/123 |
| 7,272,956 B1 * | 9/2007 | Anikitchev et al. | 65/409 |
| 7,286,283 B2 | 10/2007 | Starodoumov | |

(Continued)

OTHER PUBLICATIONS

D. Noordegraaf et al., "7+1 Pump/Signal Combiner for Air-Clad Fiber with 15 μm MFD PM Single-Mode Signal Feed-Through", Proc. of SPIE 2010, vol. 7580, pp. 75801A-1-75801A-7.

(Continued)

*Primary Examiner* — Peter Radkowski
(74) *Attorney, Agent, or Firm* — ADMCLO/JAZ; Fredric L. Sinder (57) ABSTRACT

An novel fiber pump signal combiner is disclosed in which a fiber bundle array is coupled to a double-clad fiber with a taper section that is formed by etching a tapered outer surface into the cladding of a fiber rod to produce a high quality tapered outer surface free of defects with an inner core that has a constant diameter.

8 Claims, 6 Drawing Sheets

(56) References Cited

U.S. PATENT DOCUMENTS

| | | | |
|---|---|---|---|
| 7,327,920 B2* | 2/2008 | Dong et al. | 385/115 |
| 7,409,128 B2 | 8/2008 | Holcomb et al. | |
| 7,437,046 B2* | 10/2008 | DiGiovanni et al. | 385/128 |
| 7,532,792 B2* | 5/2009 | Skovgaard et al. | 385/39 |
| 7,616,854 B2 | 11/2009 | Gill et al. | |
| 7,991,255 B2* | 8/2011 | Salokatve | 385/43 |
| 2001/0022879 A1* | 9/2001 | Wu | 385/28 |
| 2002/0054740 A1* | 5/2002 | Vakili et al. | 385/115 |
| 2002/0094159 A1* | 7/2002 | Goldberg et al. | 385/27 |
| 2003/0021518 A1* | 1/2003 | Smirnov et al. | 385/15 |
| 2004/0114858 A1* | 6/2004 | Komine | 385/31 |
| 2005/0094952 A1* | 5/2005 | Gonthier et al. | 385/100 |
| 2005/0207455 A1* | 9/2005 | MacCormack et al. | 372/6 |
| 2006/0093290 A1* | 5/2006 | Fishteyn | 385/115 |
| 2007/0003196 A1* | 1/2007 | Holcomb et al. | 385/115 |
| 2007/0172174 A1* | 7/2007 | Scerbak et al. | 385/76 |
| 2007/0212006 A1* | 9/2007 | Wysocki | 385/115 |
| 2007/0229940 A1* | 10/2007 | Sintov | 359/341.3 |
| 2007/0237453 A1* | 10/2007 | Nielsen et al. | 385/28 |
| 2007/0280597 A1* | 12/2007 | Nakai et al. | 385/43 |
| 2008/0018989 A1* | 1/2008 | Tanigawa et al. | 359/341.3 |
| 2008/0037604 A1 | 2/2008 | Savage-Leuchs | |
| 2008/0050069 A1* | 2/2008 | Skovgaard et al. | 385/39 |
| 2008/0130102 A1 | 6/2008 | Murison et al. | |
| 2008/0170823 A1* | 7/2008 | Gonthier | 385/43 |
| 2008/0193093 A1* | 8/2008 | DiGiovanni et al. | 385/115 |
| 2009/0016681 A1* | 1/2009 | DiGiovanni et al. | 385/43 |
| 2009/0067795 A1* | 3/2009 | DiGiovanni et al. | 385/128 |
| 2009/0080469 A1* | 3/2009 | Nikolajsen | 372/6 |
| 2009/0148098 A1* | 6/2009 | Lewis et al. | 385/31 |
| 2009/0154879 A1* | 6/2009 | Salokatve | 385/43 |
| 2009/0274183 A1 | 11/2009 | Kakui | |

OTHER PUBLICATIONS

B. Ward et al., "A Monolithic Pump Signal Multiplexer for Air-Clad Photonic Crystal Fiber Amplifiers", Proceedings of SPIE, 2010, vol. 7580, pp. 75801C-1-75801C-8.

C. Jauregui et al., "All-Fiber Side Pump Combiner for High Power Fiber Lasers and Amplifiers", Proceedings of SPIE, 2010, vol. 7580, pp. 75801E-1-75801E-8.

* cited by examiner

FIBER PUMP SIGNAL COMBINER

RELATED APPLICATIONS

This application claims benefit of priority from U.S. Provisional Application Ser. No. 61/230,804 filed Aug. 3, 2009, the entire contents of which are incorporated herein by reference.

RIGHTS OF THE GOVERNMENT

The invention described herein may be manufactured and used by or for the Government of the United States for all governmental purposes without the payment of any royalty.

TECHNICAL FIELD

This disclosure relates generally to methods of combining and amplifying signals. More particularly, it relates to novel methods of combining pump and signal radiation for amplification.

BACKGROUND

Fiber combiners are critical components in the development of high power fiber amplifiers and lasers. Such fused fiber combiners are used in fiber lasers and amplifiers to combine pump and signal light into active double clad fibers. However, the coupling efficiencies of current combiners are not sufficient to permit their use in very high power amplifiers and lasers. In addition, because the signal fiber is tapered down along with the pump fibers, the resulting small core diameter of the signal fiber creates significant mismatch problems for coupling with large mode area double clad fibers. These large mode field diameter mismatches cause unacceptably high loss, particularly for very large mode area photonic crystal fiber amplifiers and lasers.

Cladding-pumped fiber amplifiers and lasers possess many desirable attributes including high efficiency, diffraction-limited beam quality ruggedness, and light weight. Their primary drawback is their susceptibility to parasitic non-linear processes, primarily stimulated Brillouin scattering (SBS), which occurs when the laser signal has a line-width narrower than a few tens of megahertz. This is due to the long interaction length of the optical signal field and the core material of the fiber. Air-clad fibers possess a higher pump-cladding numerical aperture allowing multi-mode optical pump sources to be launched into smaller claddings relative to polymer and glass-clad fibers. Smaller claddings promote increased pump overlap with the core, leading to a shorter pump absorption length allowing a shorter fiber to be used, thus reducing undesirable SBS effects. Multi-mode glass-clad pump delivery fibers have numerical apertures in the range of 0.22 to 0.28 whereas glass-clad fibers have numerical apertures in the range 0.55-0.65 permitting a pump demagnification ratio of ~2-3×. While this may be accomplished with lenses, the traversing of multiple air-glass interfaces by the laser signal introduces optical loss and potential efficiency degradation and optical damage.

A more efficient and robust approach is to bundle a single signal delivery fiber together with multiple pump delivery fibers and then interface the bundle with a suitable double-clad active fiber wherein the signal is amplified. Efficiency requires that the cores of the double-clad and signal delivery fibers be matched while brightness conservation requires that the diameter of the pump cladding of the double-clad fiber be ~2-3× smaller than the diameter of the bundle of pump delivery fibers. One approach has been to have the bundle of pump fibers tapered down so that the outer diameter matches that of the pump cladding of the double clad fiber. However, this results in the tapering of not only the pump fibers but also the signal delivery fiber core creating a significant mode-mismatch between the signal fiber and the core of the double clad fiber. This large mismatch results in unacceptably high loss especially for very large mode area photonic crystal fibers. If the core of the double-clad fiber is made smaller to match the tapered bundle, the non-linear threshold is decreased thus reducing the effectiveness of the device. Another approach has been to have the double-clad fiber be tapered rather than the fiber bundle. This also results in a decrease in the non-linear threshold within the tapered double-clad fiber. If the signal delivery fiber is made larger to compensate for the taper within the double-clad fiber, it likely will support multiple transverse modes hindering the effective launching of the signal.

SUMMARY OF INVENTION

The disclosed combiner overcomes these limitations with a novel taper section that is used to connect a fiber bundle to a double-clad signal fiber. The taper section is fabricated from a fiber rod by etching away the cladding of the fiber rod to produce a tapered surface while leaving the diameter of the core of the fiber rod unaffected along the length of the taper section. This permits efficient signal delivery throughput as well as pump demagnification.

The disclosed combiner can combine multiple transverse mode pump and single transverse mode signal radiation for injection into a double clad fiber such as an air-clad fiber to realize a fiber amplifier requiring no free space optics. The combiner accomplishes this by bringing the pump and signal radiation onto a common optical axis within a capillary-enclosed fiber bundle. The pump and signal radiation are coupled from the fiber bundle into the tapered length of optical fiber. The core within the tapered fiber section maintains the same diameter throughout the length of the taper and carries the signal. The pump and signal radiation are then coupled from the smaller end of the tapered fiber section into a double-clad fiber such as an air-clad fiber. As a result, the multi-mode pump radiation is launched into the multi-mode pump cladding of the air-clad fiber and the single-transverse mode signal radiation is efficiently coupled into the core of the air-clad fiber without either pump or signal radiation having to traverse an air-glass interface, thereby resulting in improved efficiency compared to other pump and signal multiplexing schemes. Once the combiner is assembled, no optical alignment is required thereby resulting in improved laser system reliability. When incorporated into a cladding-pumped amplifier or other amplifier, the active air-clad fiber combiner disclosed herein produces higher power output than currently-available devices.

A fiber pump signal combiner comprises: a fiber bundle including a signal fiber and a plurality of pump fibers encased within a capillary tube; a double-clad fiber having a core disposed within an inner cladding and an outer cladding; and a taper section having a core and a tapered outer surface that extends from a wide end to a narrow end of the taper section, wherein the taper section is formed by etching away portions of a fiber rod to produce the tapered outer surface without altering the diameter of the core and further wherein the wide end of the taper section is connected to one end of the fiber bundle and the narrow end of the taper section is connected to one end of the air-clad fiber.

A method of making a taper section for a fiber pump signal combiner, comprises the steps of: submerging a fiber rod having a substantially uniform cladding diameter in an acid bath; and gradually withdrawing the fiber rod from the acid bath according to a specified velocity profile, wherein a portion of the cladding is etched away to form a smooth, uniformly-tapered outer surface on the fiber rod.

A method of making a fiber pump signal combiner comprises the steps of: forming a taper section from a fiber rod by etching away cladding of the fiber rod to produce a tapered outer surface on the fiber rod; cutting the taper section from the fiber rod to produce a taper section with a wide end and a narrow end and the tapered outer surface extending therebetween; connecting the wide end of the taper section to a fiber bundle comprising a plurality of pump fibers surrounding a signal fiber within a capillary tube so the wide end of the taper section covers the pump fibers of the fiber bundle but does not cover the capillary tube that surrounds the pump fibers and signal fiber; and connecting the narrow end of the taper section to a double clad fiber comprising an inner cladding and an outer cladding so the narrow end substantially covers the inner cladding but does not cover the outer cladding of the double-clad fiber.

A taper section for a fiber pump signal combiner comprises: a fiber rod section having a smooth tapered outer surface extending from a wide end to a narrow end and an inner core with a uniform diameter that is substantially unchanged through the length of the taper section.

DETAILED DESCRIPTION

Figure 1:
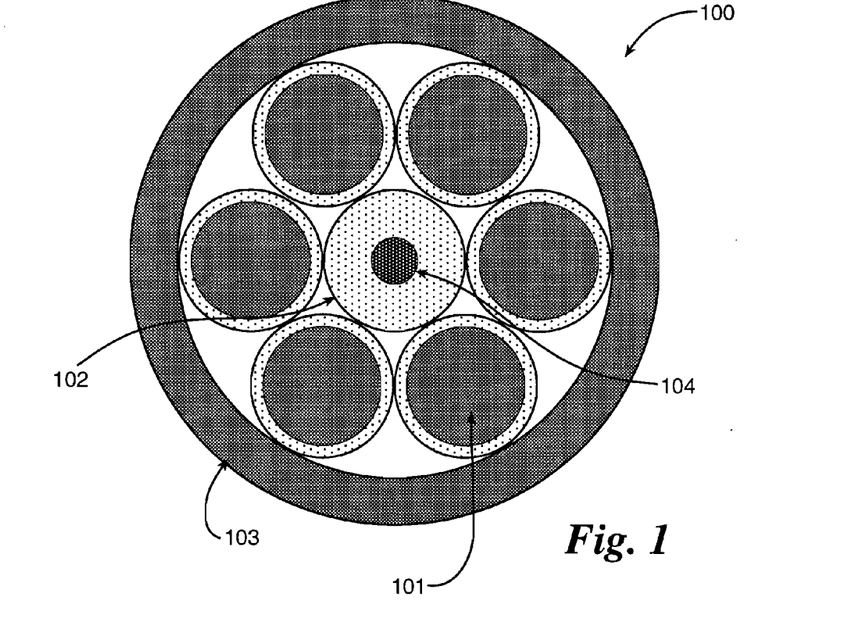
FIG. 1 is a transverse cross-sectional view of a fiber bundle.

The combiner disclosed herein comprises a taper section that is used to connect a fiber bundle to a double-clad fiber such as an air-clad fiber. The fiber bundle 100 comprises a plurality of multi-mode pump delivery fibers 101, a signal delivery fiber 102 and its core 104, and a capillary tube 103 such as a fused silica tube. The fiber bundle 100 is assembled by positioning the pump fibers 101 around the signal fiber 102 and inserting the assembled pump fibers 101 and the signal fiber 102 into the capillary tube 103. The assembled fiber bundle 100 can be heated and stretched to collapse the capillary tube 103 around the pump fibers 101 and signal fiber 102 and thereby align the pump fibers 101 and the signal fiber 102 with no fiber distortion and no loss of light into the capillary tube 103.

Figure 2:
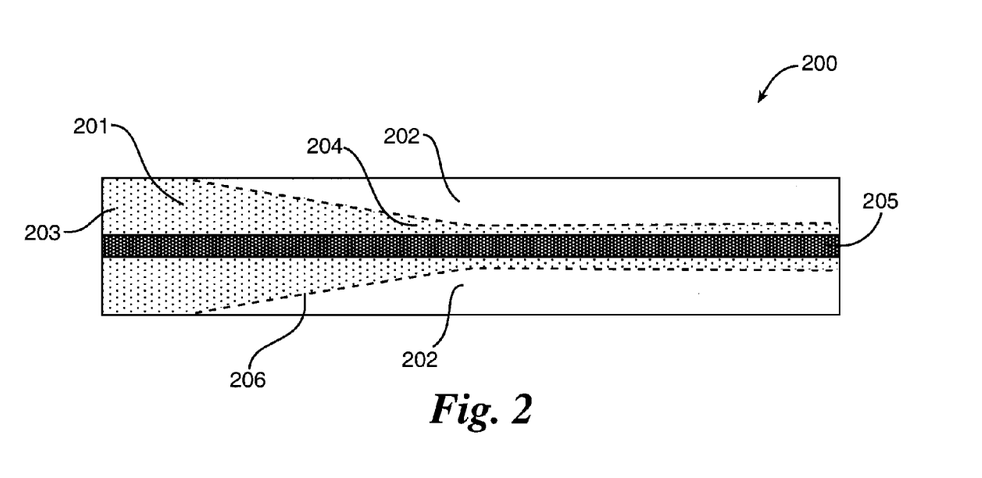
FIG. 2 shows a taper section formed by etching away cladding of a fiber rod.
Figures 3A, 3B:
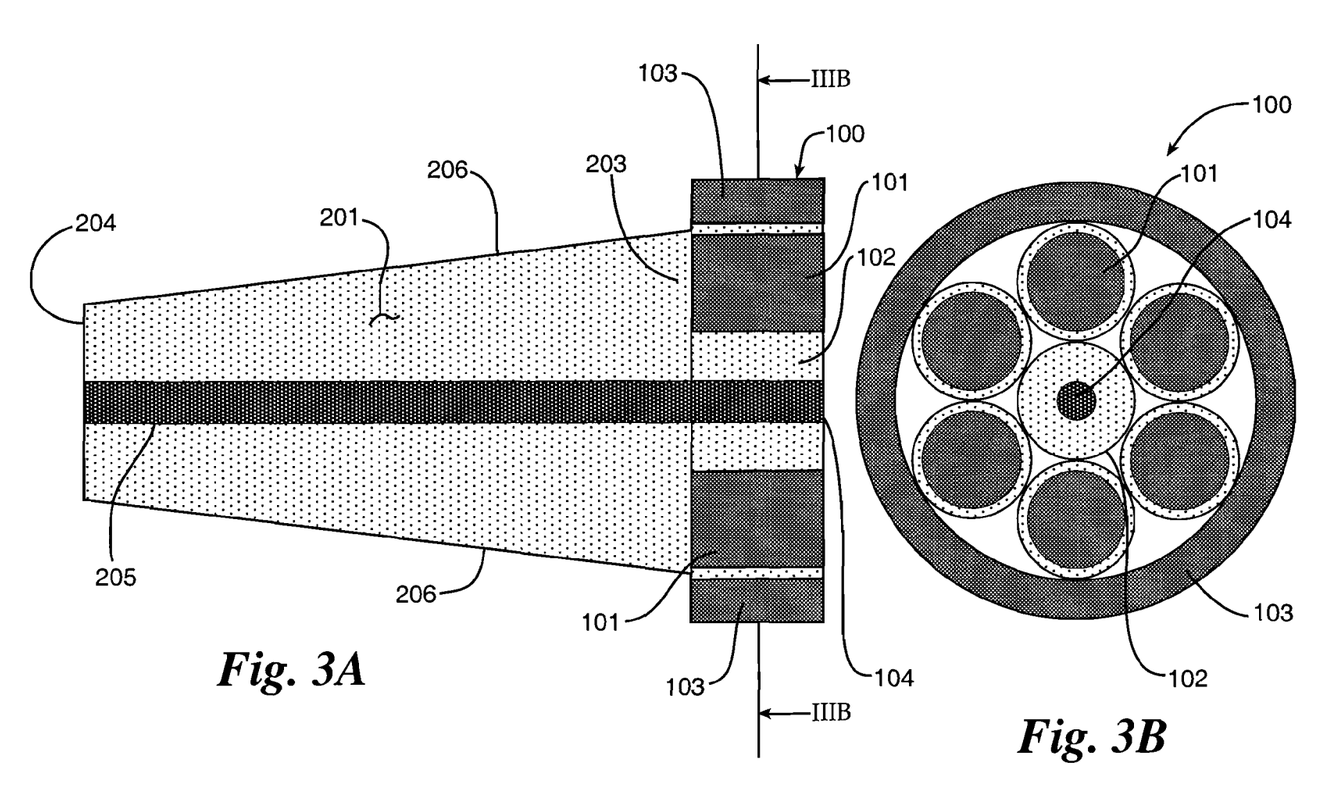
FIG. 3A is a side cross-sectional view of a taper section connected to a fiber bundle.
FIG. 3B is a transverse cross-sectional view of the fiber bundle taken along line IIIB-IIIB of FIG. 3A.
Figure 4A:
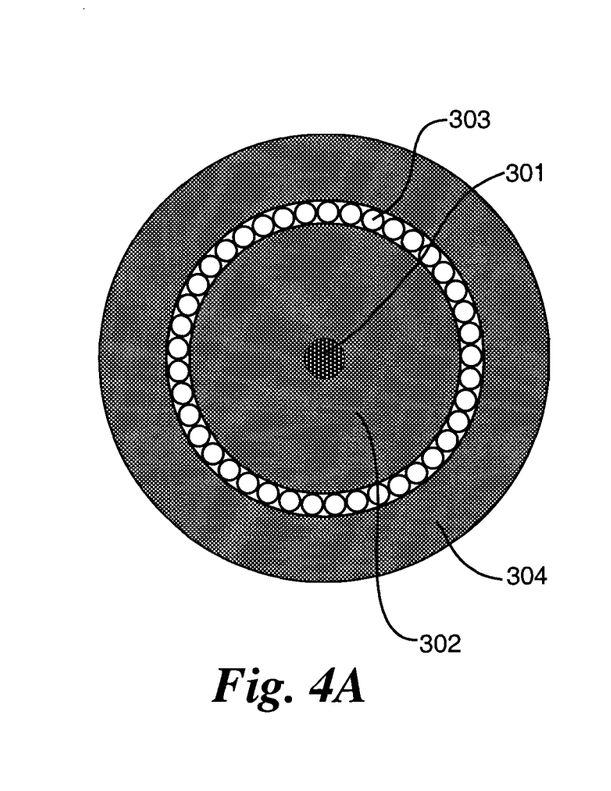
FIG. 4A is transverse cross-sectional view of an air-clad fiber taken along line IVA-IVA of FIG. 4B.
Figure 4B:
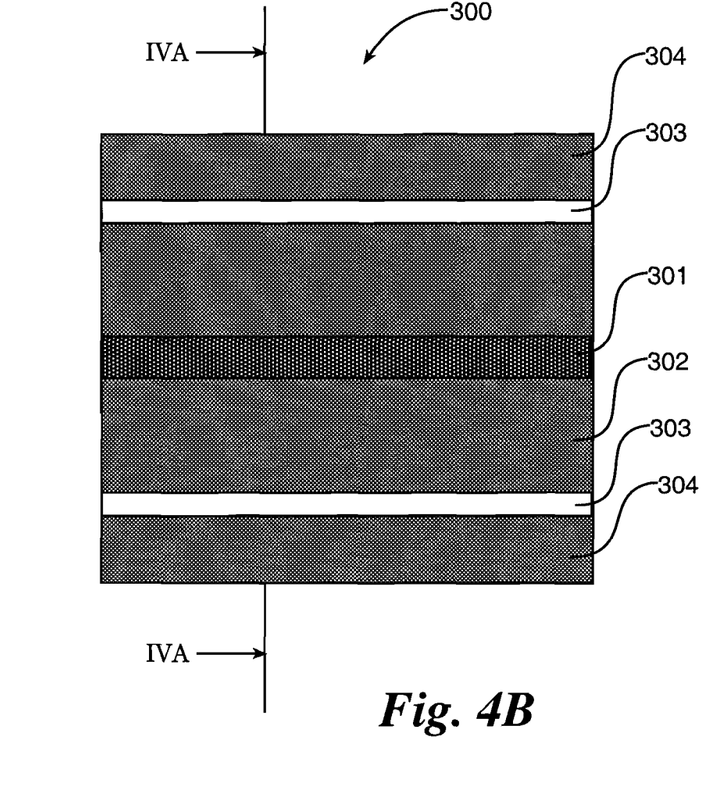
FIG. 4B is a side cross-sectional view of an air-clad fiber.
Figure 6A:
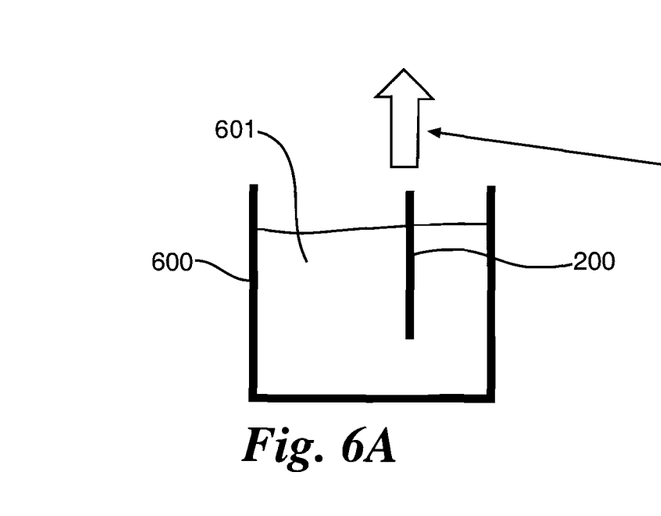
FIG. 6A discloses a process for etching a taper section from a fiber rod.
Figure 6B:
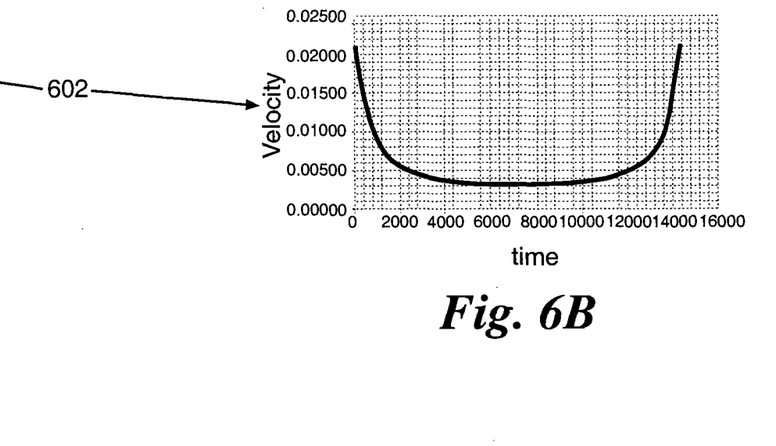
FIG. 6B discloses an exemplary velocity profile that may be used to etch a taper section from a fiber rod.
Figure 6C:
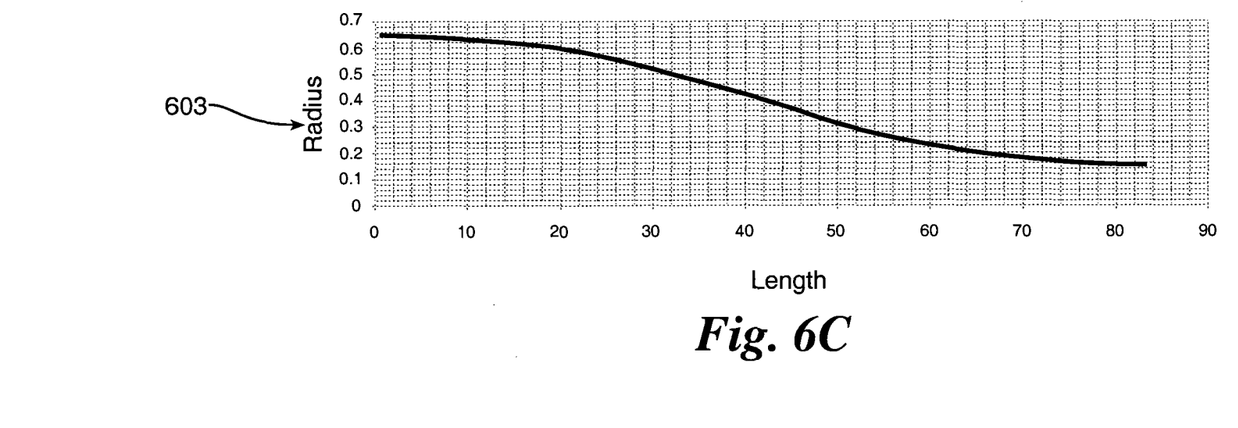
FIG. 6C discloses the reduction of the radius of an etched rod over the length of the rod for an etching process.

The taper section 201 is fabricated by etching away portions 202 of the cladding of a fiber rod 200 to produce taper sections 201 having a wide end 203, a narrow end 204, and a smooth tapered outer surface 206 extending therebetween, as shown in FIGS. 2 and 3. The tapered surface 206 of the taper section 201 has a smooth, uniform, and monotonically-decreasing tapered surface that is a function of length, while the diameter of the core 205 remains unchanged by the etching process. The etching process employs a hydrofluoric acid or other acid or substance capable of removing the glass cladding of the fiber rod 200. In one example, a length of fiber rod 200 having a uniform cladding diameter is submerged in a bath 600 of hydrofluoric acid 601, as shown in FIG. 6A, and then is withdrawn with a motorized stage according to a specified velocity profile 602, such as that shown in FIG. 6B. For example, the fiber section 200 can be pulled from the bath 600 by a device using a computer controlled linear translation stage with a velocity profile designed to produce the desired shape of the tapered surface 206. The slope of the tapered surface 206 and the taper rate are controlled by varying the stage speed to produce a gradually-reduced radius 603 for the cladding and tapered surface 206 along the length of the rod 200, as shown in FIG. 6C. A faster speed creates a more gradual taper while a slower speed creates a more rapid taper. The etching process etches away the pump cladding of the fiber rod 200 to produce a smooth tapered surface 206 while maintaining a constant diameter of the core 205 throughout the signal path. The uniform quality and smoothness of the tapered surface 206 improve the transmission efficiency because any surface defects in the tapered surface 206 scatter out light and reduce transmission. By maintaining the smoothness and uniformity of the etched tapered surface 206, transmission losses of 3% or less can be achieved. If desired the uniformity of the tapered surface 206 may be varied. The etched taper section 201 can be separated from the rod 200 by cleaving or similar means. The cleaving can be at the widest and narrowest portions of the tapered surface 206, and/or they may include a portion of the fiber rod 200 that is not etched at the wide end 203 and/or a straight portion of the fiber rod 200 at the narrow end 204.

The taper section 201 can be used to connect the fiber bundle 100 to a double clad fiber such as an air-clad fiber 300. The wide end 203 of the taper section 201 has a diameter that is sufficient to cover the pump fibers 101 of the fiber bundle 100, without touching or overlapping the capillary tube 103. Nominally, the inner diameter of the capillary tube 103 should be slightly larger than the outer diameter of the wide end 203 of the taper section 201. The diameter of the core 205 of the taper section 201 should generally match the diameter of the core 104 of the signal fiber 102 of the fiber bundle 100. The outer diameter of the narrow end 204 of the taper section 201 is substantially equal to the outer diameter of the pump cladding 302 of the air-clad fiber 300. The air-clad fiber 300 comprises an inner core 301 that is encased in an inner cladding or pump cladding 302. The inner cladding 302 is encased in an outer cladding such as an air cladding 303, which in turn may be encased in a jacket 304.

Figures 5A, 5C:
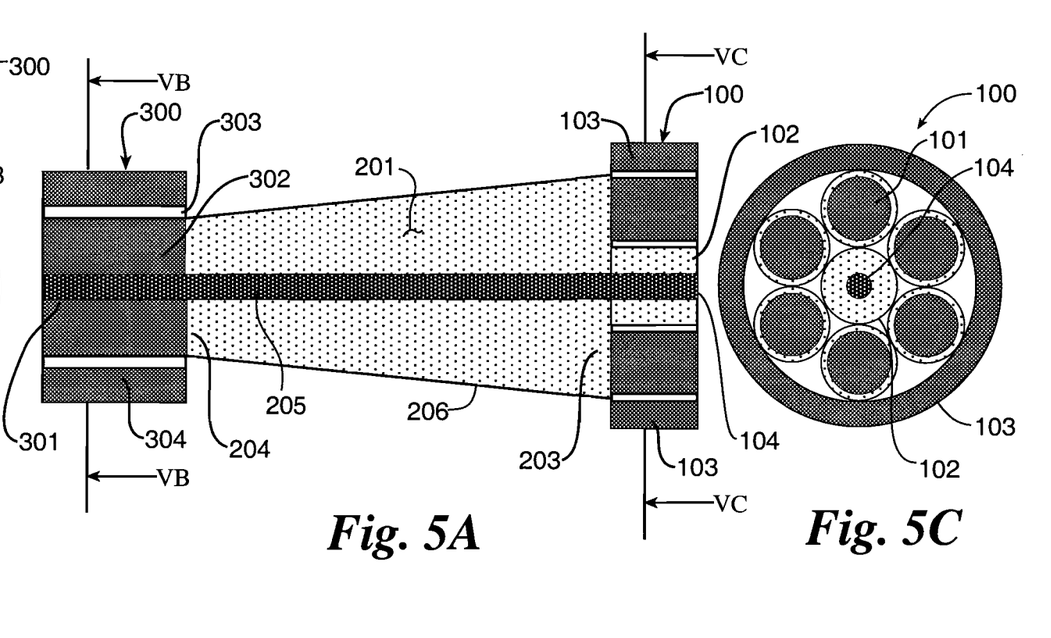
FIG. 5A is a side cross-sectional view of a taper section assembled to a fiber bundle and an air-clad fiber.
FIG. 5C is a transverse cross-sectional view of a fiber bundle taken along line VC-VC of FIG. 5A.
Figure 5B:
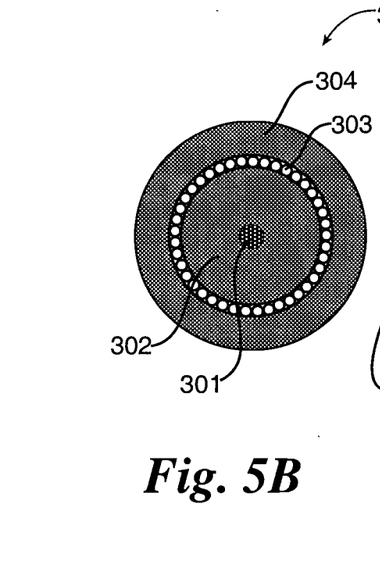
FIG. 5B is a transverse cross-sectional view of an air-clad fiber taken along line VB-VB of FIG. 5A.

The wide end 203 of the taper section 201 can be connected to the fiber bundle 100 through any number of suitable methods including a fusion splice. The narrow end 204 of the taper section 201 can be connected to the air-clad fiber via a suitable connection such as a fusion splice. These connections eliminate any air interface. Moreover, they can be improved further by cleaving the fiber bundle 100 and air-clad fiber 300 and polishing the cleaved ends before connecting them to the taper section 201. Such connections produce very low loss splices. The entire assembly is then packaged within a suitable container that provides mechanical support and isolation of the taper section connection from outside contaminants.

Figure 7:
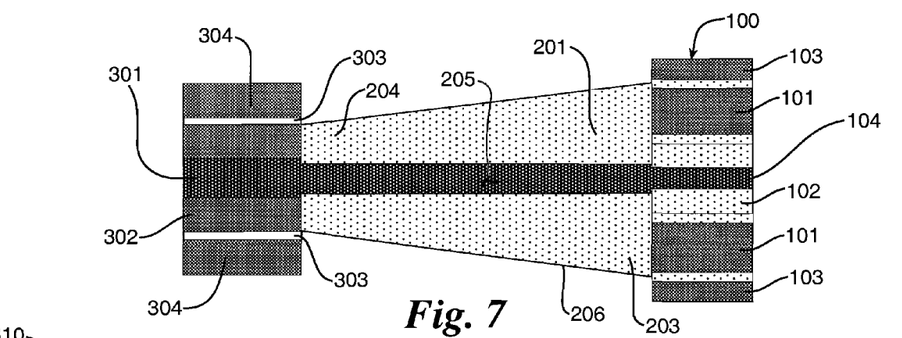
FIG. 7 discloses an assembled combiner in which the diameter of the core of the air-clad fiber is greater than the diameter of the core of the signal fiber and the diameter of core of the taper section is an intermediate diameter.
Figure 8:
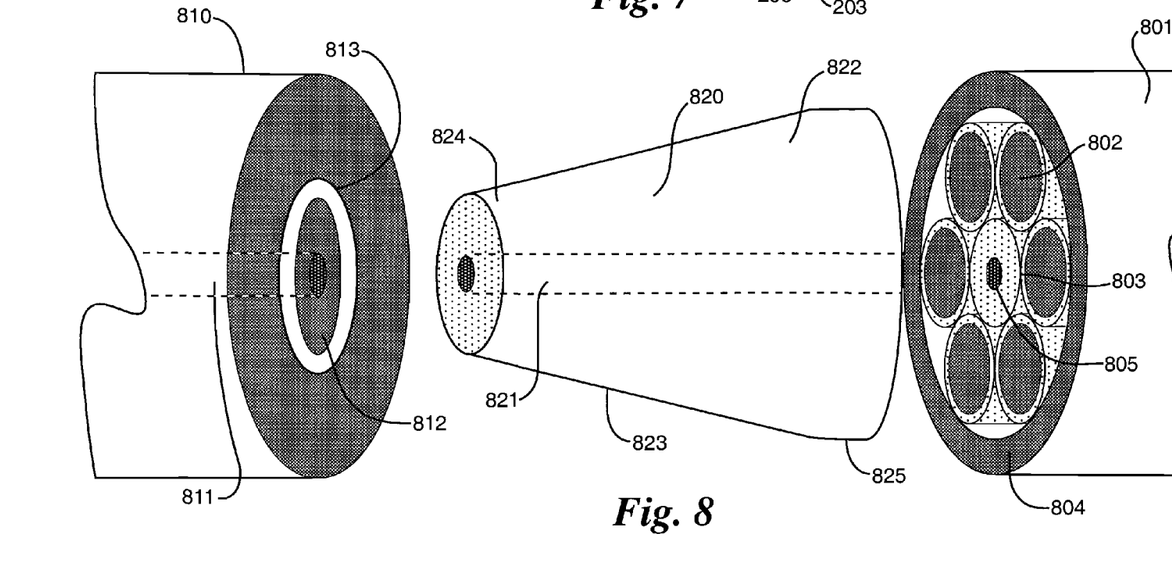
FIG. 8 is a sectional view of a fiber bundle, taper section, and double-clad fiber prior to assembly.

If the diameter of the core 301 of the double clad fiber 300 is larger than the diameter of the core 104 of the signal delivery fiber 102, the core 205 of the etched taper section 201 may have an intermediate diameter between these two diameters, as shown in FIG. 7 to reduce any mode-matching loss. For example, a fiber bundle 801 with six pump fibers 802 surrounding a signal fiber 803 that has a 20 μm core 805 can be connected to an air-clad fiber 810 having a 40 μm core 811 by a taper section 820 having a 30 μm core 821. In this example, the outer diameter of the capillary tube 804 of the fiber bundle 801 is approximately 1500 μm. The outer diameter of the wide end 822 of the taper section 820 is approximately 1350 μm so that it covers the pump fibers 802 of the fiber bundle 801 but does not contact or cover the capillary tube 804. The wide end 822 of the taper section 820 also can have a straight segment 825 of constant diameter adjacent to the tapered surface 823, as shown in FIG. 8. The etched tapered surface 823 has a smooth, uniform or substantially uniform surface that reduces in diameter from the wide end 822 to a narrow end 824 that is approximately 500 μm. The diameter of the narrow end 824 is approximately the same as the diameter of the pump cladding 812 of the air-clad fiber 810 and does not overlap or contact any portion of the air cladding 813. If desired, the narrow end 824 of the taper section 820 can include a segment of constant diameter adjacent to and extending away from the narrow end 824.

The foregoing disclosure has been presented for purposes of illustration and description and is not intended to be exhaustive or to limit the disclosure to the methods and forms disclosed herein. Persons skilled in the art will realize and appreciate that many modifications and variations are possible in light of the above teachings. For example, other acids and substances may be used to etch the tapered surface into the fiber rod to produce a suitable taper section. The disclosed combiners may be used to couple different configurations of fiber bundles to other types of double-clad fibers. Other methods may be used to etch a taper section from a fiber rod depending on the composition of the cladding to be etched from the fiber rod. The disclosed methods and devices and their variations were described to best explain the principles of the invention and its practical applications to thereby enable other persons skilled in the art to make and use the inventions in their various forms and with their various modifications as are suited to the particular uses contemplated. The scope of the disclosed inventions is to be defined by the following claims.

What is claimed is:

1. A fiber pump signal combiner comprising:
   a fiber bundle including:
      a signal fiber having a core and cladding; and
      a plurality of pump fibers;
      the signal fiber and plurality of pump fibers encased within a capillary tube;
   a double-clad fiber having a core disposed within an inner cladding and an outer cladding; and
   a taper section having:
      an inner signal fiber;
      a tapered outer surface that extends from a wide end to a narrow end of the taper section;
      the wide end of the taper section connected to one end of the fiber bundle; and
      the narrow end of the taper section connected to one end of the double-clad fiber,
      wherein the inner signal fiber couples the core of the signal fiber of the fiber bundle to the core of the double-clad fiber, and
      wherein the wide end of the taper section covers the plurality of pump fibers in the fiber bundle and does not cover the capillary tube of the fiber bundle, and
      wherein the narrow end of the taper section covers the inner cladding of the double-clad fiber and does not cover the outer cladding of the double-clad fiber, and
      wherein the taper section is formed by etching away portions of a fiber rod to produce the tapered outer surface without altering the diameter of the taper section inner signal fiber.

2. The fiber pump signal combiner of claim 1, wherein the signal fiber of the fiber bundle has a core and the diameter of the core of the taper section is substantially the same as the diameter of the core of the fiber bundle signal fiber and the diameter of the core of the double-clad fiber.

3. The fiber pump signal combiner of claim 1, wherein the signal fiber of the fiber bundle has a core and the diameter of the core of the taper section is between the diameter of the core of the fiber bundle signal fiber and the diameter of the core of the double-clad fiber.

4. The fiber pump signal combiner of claim 1, wherein the signal fiber of the fiber bundle has a core and the diameter of the taper section inner signal fiber is greater than the diameter of the core of the fiber bundle signal fiber and less than the diameter of the core of the double-clad fiber.

5. The fiber pump signal combiner of claim 1, wherein an outer diameter of the wide end of the taper section is the same or slightly greater than an outer diameter of the pump fibers of the fiber bundle and an outer diameter of the narrow end of the taper section is the same or slightly greater than an outer diameter of the inner cladding of the double-clad fiber, and further wherein the wide end of the taper section does not cover or contact the capillary tube of the fiber bundle and the narrow end of the taper section does not cover or contact the outer cladding of the double-clad fiber.

6. The fiber pump signal combiner of claim 1, wherein the tapered outer surface of the taper section is etched using a hydrofluoric acid to produce a smooth, uniform, and monotonically-decreasing surface.

7. The fiber pump signal combiner of claim 1, wherein the pump fibers surround the fiber bundle signal fiber within the capillary tube and the double-clad fiber is an air-clad fiber.

8. The fiber pump signal combiner of claim 1, wherein the taper section is connected to the fiber bundle and the double-clad fiber by cleaving and polishing an end of the fiber bundle and the double-clad fiber and then fusion splicing the polished end of the fiber bundle to the wide end of the taper section and fusion splicing the polished end of the double-clad fiber to the narrow end of the taper section.

* * * * *